United States Patent [19]
Vroman

[11] 3,978,567
[45] Sept. 7, 1976

[54] METHOD OF MAKING A CATALYTIC REACTOR FOR AUTOMOBILE

[75] Inventor: William Riley Vroman, Madison Heights, Mich.

[73] Assignee: Chrysler Corporation, Highland Park, Mich.

[22] Filed: Feb. 20, 1975

[21] Appl. No.: 551,442

Related U.S. Application Data
[62] Division of Ser. No. 342,575, March 19, 1973.

[52] U.S. Cl. .................... 29/157 R; 29/419 R; 29/455 R; 29/463; 23/288 FC; 60/299; 252/477 R; 264/296; 264/320
[51] Int. Cl.² .................. B23P 15/00; B01J 8/04; B01J 35/04; B29C 15/00
[58] Field of Search ................ 29/157 R, 419, 455, 29/463; 23/288 FC; 264/177 R, 209, 296, 320, 293; 138/148; 60/299; 252/477 R

[56] References Cited
UNITED STATES PATENTS

| | | | |
|---|---|---|---|
| 2,930,407 | 3/1960 | Conley et al. | 138/148 |
| 3,065,595 | 11/1962 | Gary | 23/288 FC |
| 3,404,445 | 10/1968 | Crouse | 29/157 R |
| 3,562,382 | 2/1971 | Ayres | 264/320 |
| 3,597,165 | 8/1971 | Keith et al. | 23/288 FC |
| 3,692,497 | 9/1972 | Keith et al. | 23/288 FC |
| 3,746,608 | 7/1973 | Takahashi | 264/293 |
| 3,771,967 | 11/1973 | Nowak | 23/288 FC |
| 3,817,714 | 6/1974 | Wiley | 60/299 |
| 3,838,977 | 10/1974 | Warren | 23/288 F |
| 3,852,041 | 12/1974 | Moore et al. | 60/299 |
| 3,852,042 | 12/1974 | Wagner | 60/299 |
| 3,853,483 | 12/1974 | Cross | 23/288 F |
| 3,912,459 | 10/1975 | Kearsley | 23/288 FC |

*Primary Examiner*—C.W. Lanham
*Assistant Examiner*—Dan C. Crane
*Attorney, Agent, or Firm*—Talburtt & Baldwin

[57] ABSTRACT

A catalytic reactor is made by providing a generally cylindrical catalytic substrate of oval transverse section and clamping the same between paired housing shells to form a housing of oval section spaced from the substrate by means of a pair of wire mesh ropes seated within a corresponding pair of grooves extending around the periphery of the substrate at axially spaced locations. Each rope is compacted from a matrix of multiple layers of resilient stainless steel knitted wire and is interlocked with the housing by means of a pair of inwardly opening channels of the housing spaced axially by an inwardly projecting rib of the housing. The grooves in the substrate are pressed radially into the latter while the same is in a plastic uncured condition, thereby to compact and reinforce the grooves to withstand the localized compressional force of the ropes seated therein after the substrate is cured and hardened and clamped between the housing shells.

14 Claims, 5 Drawing Figures

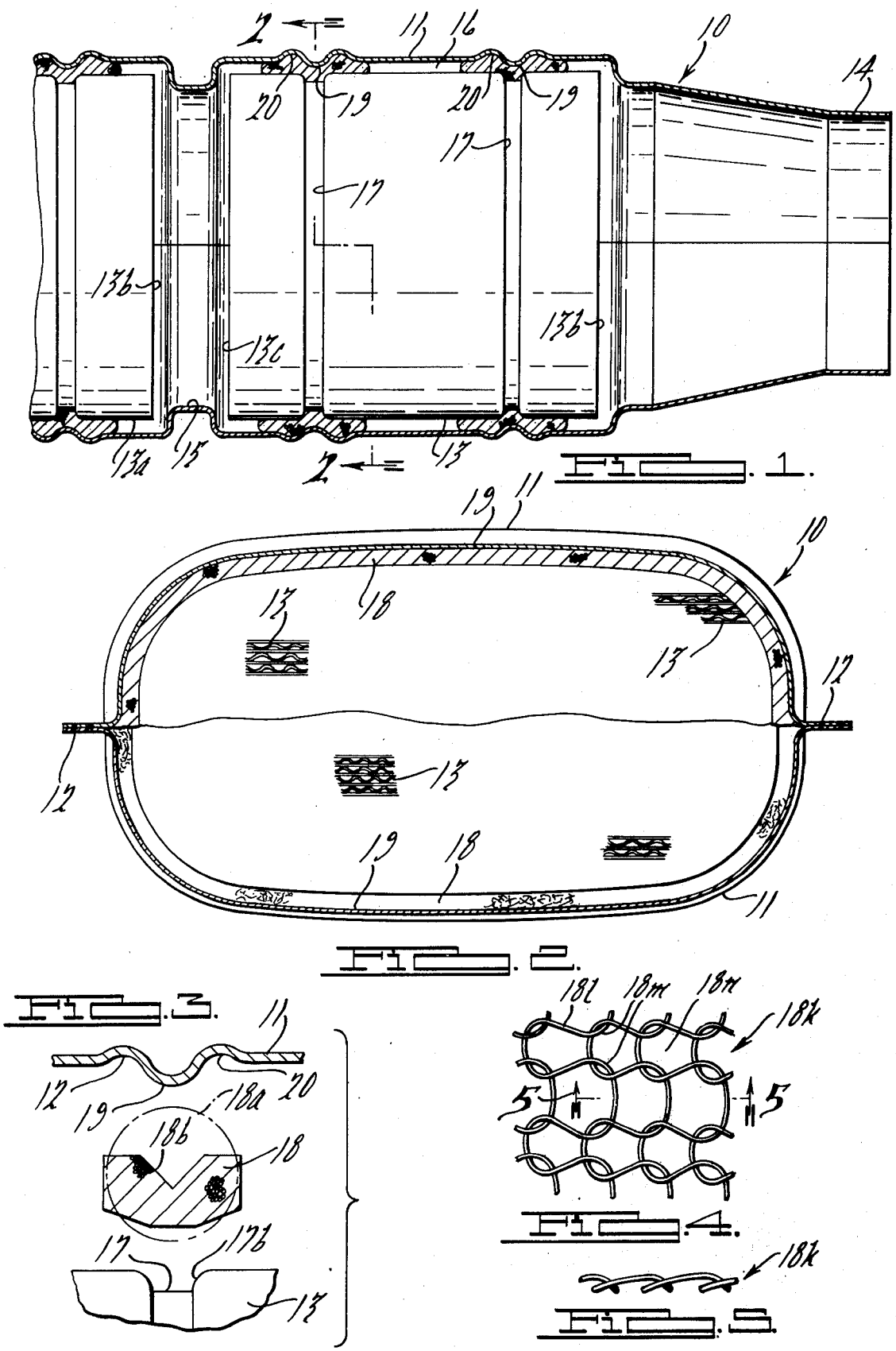

METHOD OF MAKING A CATALYTIC REACTOR FOR AUTOMOBILE

BACKGROUND AND SUMMARY OF THE INVENTION

This application is a division of copending application Ser. No. 342,575, filed Mar. 19, 1973 and relates to improvements in a catalytic reactor for automobile engine exhaust comprising a monolithic substrate or support for a catalyst confined within a housing.

In such constructions, the substrate comprises a porous ceramic core treated with a catalyst for expediting the reaction of certain components in the exhaust gas flowing axially through the core. Because of the comparatively intense heat of the reaction and the constant and often severe vibration of the reactor resulting from gas pulsation and road shock, difficulty has been experienced in cushioning the core to prevent its disintegration after a short interval of operation. Attempts heretofore to grip the substrate firmly within the housing have invariably resulted in excessive frictional wear of the substrate at the location of the gripping elements. A resilient steel mesh blanket around the substrate to support the same has been proposed, but attempts to provide such a support heretofore have been costly and have not adequately supported the substrate after the resiliency of the steel wire or fibers in the mesh is impaired by the operational heat of the reactor.

Any attempt to support the substrate in spaced relationship with the sidewalls of the housing so as to prevent frictional wear also preferably provides a gas seal in the space between the substrate and housing, otherwise a large portion of the exhaust gases that should be directed through the porous substrate will bypass the latter and flow through the aforesaid space and be exhausted to the atmosphere without reaction.

It is accordingly an important object of the present invention to provide an improved reactor and method of manufacturing the same wherein a monolithic substrate is supported in spaced relationship with respect to the housing at all locations by means of a compacted resilient wire mesh clamped between a pair of housing shells arranged to exert a clamping force directed toward the outer peripheral surface of the substrate around the gas flow therethrough. The substrate and housing are preferably of oval cross section transverse to the direction of gas flow and the housing shell sections are clamped together by force directed transversely of the latter direction and also transversely of the shorter axis of the oval section to permit exposure of the maximum surface area of the substrate to the clamping force. Also in a preferred construction the wire mesh comprises a pair of wire mesh rope like supports, hereinafter called ropes, extending around the substrate in closed loops transverse to the axial gas flow through the reactor and confined within a corresponding pair of axially spaced grooves in the outer surface of the substrate.

The porous substrate is formed from a curable plastic by an extrusion process and is thereafter cured or hardened to provide a comparatively soft brittle porous monolithic matrix or core readily subject to abrasion. After extrusion and prior to curing of the matrix, the aforesaid grooves are pressed into the outer surface of the matrix by a suitable die, whereby the dimensions of the matrix at the location of the grooves are readily maintained within close tolerances and the material of the matrix at the grooves is compacted to provide reinforced regions capable of being firmly gripped and supported by the wire mesh ropes.

The ropes are preferably formed from a multitude of layers of knitted resilient stainless steel wire to comprise a matrix that is subsequently pressed and densely compacted in a die to provide a mesh rope of accurately predetermined cross section dimensioned to fit snugly within the aforesaid grooves and to effect an interference fit between the assembled substrate and housing. Each die formed rope is preferably provided with a lengthwise extending groove in its outer surface. The housing is preferably formed from sheet steel reinforced by a pair of inwardly projecting ribs or projections formed therein to overlie the grooves in the ropes and to effect an interference fit therein when the two housing shells are assembled around the substrate and forced together to clamp the mesh between the substrate and housing. Also the housing shells are preferably formed with a pair of inwardly opening channels associated with each rib and spaced laterally thereby to receive portions of the ropes compacted therein or displaced by the ribs when the housing shells are assembled and pressed together with the substrate therebetween.

In consequence of the above described structure, it is only necessary to maintain close production tolerance for the dimensions of the wire mesh ropes, the grooves in the substrate, and the aforesaid projections and channels of the housing. These dimensions result from die forming operations and are comparatively simple to maintain with a minimum of precision dies. A tight interlock is provided between the housing and substrate and in particular between the housing and mesh to prevent relative movement therebetween in any direction. The densely compacted resilient wire mesh matrix of each rope effects a high resistance seal to prevent gas flow that would otherwise bypass the catalyst support or substrate in the space between the latter and housing.

Also by virtue of the compacted rope matrices, even though a major portion of the resilience of the individual wires or fibers of the matrix is lost in consequence of high temperature operation, the rope matrices will still retain sufficient resiliency to grip and retain the substrate firmly in spaced relationship with respect to the housing. By gripping the support at two axially spaced locations, cocking of the substrate within the housing is prevented. Also the compacted die-formed ropes render it unnecessary to grip the substrate throughout its entire axial length. Of course additional ropes arranged as described may be employed if desired between the first named ropes to enhance the sealing effect or to distribute the load on the substrate over a larger area. By virtue of the optimum total clamping force against the outer periphery of the substrate achieved by the present invention, the initial compacting of the mesh prior to clamping of the housing shell sections together may be minimized without sacrificing the positive substrate support required to prevent relative movement between the substrate and housing.

Other objects of this invention will appear in the following description and appended claims, reference being had to the accompanying drawings forming a part of this specification wherein like reference characters designate corresponding parts in the several views.

FIG. 1 is a longitudinal mid-section through a reactor embodying the present invention.

FIG. 2 is a transverse section taken in the direction of the arrows substantially along the broken line 2—2 of FIG. 1.

FIG. 3 is a fragmentary enlarged exploded sectional view of portions of the housing, die formed rope mesh, and grooved substrate of FIG. 1 prior to assembly and deformation of the rope mesh to effect a sealing support for the substrate.

FIGS. 4 and 5 are plan and sectional views respectively illustrating details of a type of a single layer of knitted wire mesh suitable for use in the rope support.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a catalytic reactor 10 is illustrated comprising two sheet steel housing shells 11 flanged and welded securely together at the gas tight seal 12 along the mid-plane containing the major transverse axis of the generally oval or elliptical cross-sectional shape of one of the monolithic substrates or supports 13 for a catalyst, FIG. 2. The housing 11 is provided with an inlet 14 and an outlet 15 for conducting exhaust gases axially to and from the substrate 13. In this regard, the reactor 10 may comprise a single catalytic substrate 13, or several similar substrates in series. Thus in the present instance the outlet 15 also comprises the inlet for a second monolithic substrate 13a identical to the substrate 13.

In the fabrication, the substrate 13 is extruded in a plastic condition to provide a porous cylindrical core or log having axially opposite plane end faces 13b and 13c through which the exhaust gases may flow axially i.e., from right to left in FIG. 1. The core or substrate 13 has a cross sectional shape transverse to the axial gas flow similar to the housing 11, but lightly smaller to provide a space 16 between the interior of the housing 11 and the oval periphery of the substrate 13 entirely around the latter periphery.

After the extrusion and while the substrate or core 13 is still plastic, a pair of axially spaced grooves 17 are pressed thereinto entirely around its periphery, thereby to compact the plastic material of the core or substrate 13 to reinforce the latter at the regions of the grooves 17 and also to provide peripheral seats for a pair of die formed seal ropes 18. During formation of the grooves 17, their outer corner edges are also compacted to effect rounded edges 17b, thereby to reinforce these edges in contact with the ropes 18 and to avoid sharp edges that would otherwise tend to break under pressure. Eventually the core 13 is treated with a suitable catalyst and cured to its final hardened condition for assembly in the reactor 10.

The ropes 18 space the substrate 13 entirely from the interior of the housing 11 and also provide effective seals to prevent gas flow in the space 16. Preferably the ropes 18 are initially formed from multiple layers 18k, FIG. 4 of knitted stainless steel wire to comprise a compact matrix 18a, phantom view in FIG. 4, having approximately twice the cross sectional area of the final shape 18, solid lines in FIG. 3. Thereafter the matrix 18a is compacted under pressure in a die to the high density shape 18 having a centrally located channel 18b extending the entire length of its outer surfaces.

The steel wires or fibers in the matrix are selected to withstand the reactor operating temperatures and are preferably less than 0.01 inch diameter. A satisfactory mesh 18k comprising 0.0045 inch diameter wire knitted as illustrated in FIG. 4 has been tested satisfactorily. Instead of the single wire knit shown, each wire shown may comprise multiple thin strands to achieve optimum flexibility with a knit mesh of a given weight.

Numerous mesh forms having the characteristics of the knitted mesh 18k may be employed to provide a wire matrix of shallow undulations arranged in layers to effect a resilient cushioning of the substrate 13 in the assembled reactor 10, as described below. The knit wire pattern, as distinct from a woven pattern, is particularly satisfactory because as illustrated in FIG. 4 separate portions of the wire mesh 18k are maintained in spaced relationship and the undulations of the wire are on the order of magnitude of the wire diameter. Preferably multiple knitted layers are gathered into an elongated rope having the general cross section 18a, FIG. 3, by successively knitting one layer 18k around the other to complete a partially compacted assembly 18a.

The loops 18l of the various layers are superimposed on each other at random, so that the interlocking portions 18m of one layer do not necessarily overlie the similar interlocking portions of the adjacent layers, but usually fall within the voids or spaces 18n defined by the individual loops 18l of the adjacent layers. The rope 18a is further compacted under considerable pressure between suitable dies to the dense cross section illustrated at 18, FIG. 3, to effect a springy rope-like pad.

Each housing shell 11 is formed with a pair of inward projections or ribs 19 adapted to seat within the underlying rope groove 18b at the interference fit so as to depress the associated material of the rope 18 into its groove 17 and to spread excess material of the rope 18 laterally into the space 16. Spaced laterally by each projection 19 are two inwardly opening channels 20 of the housing shell 11 arranged to receive the laterally displaced material of the ropes 18 snugly and to interlock therewith when the projections 19 are forced into the rope channels 18b. The projections 19 and channels 20 of each housing shell 11 cooperate to reinforce the housing shells, to prevent their being buckled out of shape by the clamping force, and also to extend entirely around the circumference of the substrate 13 and overlie the associated ropes 18. Thus in the assembled position, the ropes 18 interlock the substrate 13 and housing 11 and positively prevent relative motion therebetween.

In assembly, after a suitable catalyst is applied to the substrate 13 and the latter with its grooves 17 is cured and hardened, the die formed ropes 18 in the condition illustrated in solid lines, FIG. 3 are assembled within the grooves 17. Thereafter the two housing shells 11 are forced together with the substrate 13 and ropes 18 therebetween to force the projections 19 into the grooves 18b and to displace adjacent portions of the ropes 18 laterally into the channels 20 to snugly fill the same whereby the ropes 18 are compressed still further to the shape illustrated in FIG. 1 and the flanges 12 are forced together and welded to each other at a gas tight seal.

The strength of the substrate 13 required to withstand the resulting high pressure forces underlying the ropes 18 is achieved by reason of the aforesaid compacting and reinforcing at the regions of the grooves 17, 17a prior to curing and hardening of the substrate 13. Also the densely compacted ropes 18 provide a limited resiliency to grip the support and housing i.e., the ropes 18 are not compacted to their limits of compressability so as to eliminate all air space between individual wire strands or fibers 18l and 18m of the stainless steel, but they are compacted to the extent that after the individual wires lose much of their resiliency in consequence of being subjected to high operational temperatures, the ropes 18 will still provide adequate mass to retain the fixed spaced relationship between the substrate 13 and housing 11. Furthermore, the densely compacted ropes 18 in the finally compacted shape of FIG. 1 provide a high resistance seal to gas flow in the space 16.

Where the resistance to gas flow in the space 16 is of less concern, the initial compacting of the mesh 18 prior to the clamping action by the housing shells 11 may be reduced. Also, if the material of the substrate 13 is sufficiently strong to withstand the clamping force, especially when the mesh 18 and correspondingly the clamping force is distributed over a comparatively large peripheral area of the substrate 13, the reinforcing grooves 17 may be eliminated.

I claim:

1. In the method of manufacturing a catalytic reactor, forming a curable plastic to provide a porous monolithic catalyst substrate adapted for axial gas flow therethrough and, before said plastic is completely cured, increasing the density of said plastic adjacent its outer surface at a region thereof around the axis of said gas flow to reinforce said plastic at said region by depressing the outer surface of said substrate at said region, thereafter curing said plastic to provide a hardened substrate for said catalyst, providing a housing of separate form sustaining sections for said substrate adapted to enclose said outer surface in spaced relationship, and supporting said substrate in spaced relationship within said housing by clamping a substrate support transversely of said axis and between said housing sections and said region of said outer surface.

2. In the method of claim 1, the process of increasing the density of said plastic comprising the depressing of said outer surface of a pair of axially spaced locations around said axis to form a pair of grooves in said surface at said locations, forming a substrate support by die forming a resilient wire mesh matrix to provide a pair of densely compacted ropes of said mesh dimensioned to interfit in said grooves respectively with an interference fit between said housing and substrate entirely around the latter when the reactor is assembled, and assemblying said ropes in said grooves prior to clamping said ropes between said housing and substrate.

3. In the method of claim 2, the die forming of said matrix also comprising the formation of a groove in the outer surface of each rope, and the provision of said housing including the formation of a pair of inward projections of said housing for affecting an interference fit within the grooves of said ropes when said reactor is assembled.

4. In the method of claim 3, the provision of said housing including the formation of a pair of inwardly opening channels therein associated with each inward projection and spaced axially thereby for receiving portions of said ropes compacted therein by said clamping.

5. In the method of claim 4, said substrate being extruded with an elongated cross section transverse to said axial gas flow, the provision of said housing comprising the formation of two housing shells conforming in cross section generally to the cross sectional shape of said substrate and oversize with respect thereto and adapted to be joined adjacent a mid-plane through the longer dimension of said cross sectional shape to complete said housing, applying said catalyst to said substrate, assembling said substrate, catalyst, and ropes to complete a sub-assembly, then clamping said sub-assembly between said shells with sufficient force to effect said support for said substrate within said housing and to depress said inward projections into the grooves of said ropes and also compact portions of said ropes into said inwardly open channels of said housing, and thereafter joining said shells together adjacent said mid-plane.

6. In the method of claim 1, the providing of said housing comprising the formation thereof in separate sections each adapted to extend longitudinally of said axial gas flow and partially around said substrate with edges engageable with edges of the next adjacent section when forced together during assembly of said reactor, providing a sub-assembly of said substrate and support, then clamping said sub-assembly between said sections with sufficient force to effect said supporting of said substrate.

7. In the method of claim 6 said supporting of said substrate comprising the provision of a fibrous wire mesh for said support means.

8. In the method of claim 7, the provision of said housing including the formation of a pair of inward projections of said housing adapted to effect an interference fit within said mesh.

9. In the method of claim 8, forming said substrate and housing with elongated cross sections transverse to said axial gas flow, forming said housing in separate shells comprising said sections and having said edges extending longitudinally of said gas flow adjacent opposite ends of the longer dimension of said cross section.

10. In the method of claim 6, forming said substrate and housing with elongated cross sections transverse to said axial gas flow, forming said housing in separate shells comprising said sections and having said edges extending longitudinally of said gas flow adjacent opposite ends of the longer dimension of said cross section.

11. In the method of claim 1, the process of increasing the density of said plastic before the same is completely cured comprising the depressing of said outer surface at a localized region around said axis to form a groove in said surface entirely around said axis, and the supporting of said substrate comprising the clamping of said substrate support between said housing sections and outer surface and into said groove.

12. In the method of claim 11, forming said substrate support by die forming a resilient wire mesh matrix to provide a densely compacted rope of said mesh dimensioned to interfit in said groove with an interference fit between said housing and substrate entirely around the latter when the reactor is assembled, and assemblying said rope in said groove prior to clamping said rope between said housing and substrate.

13. In the method of claim 12, the die forming of said matrix also comprising the formation of a groove in the outer surface of the rope, and the provision of said housing including the formation of an inward projection of said housing for affecting an interference fit within the groove in said rope when said reactor is assembled.

14. In the method of claim 13, the provision of said housing including the formation of a pair of inwardly opening channels therein spaced axially by said inward projection.

* * * * *

Disclaimer 3,978,567.—*Jack Mustoe, Jr.*, Cumbernauld, Scotland. NAIL EXTRACTOR. Patent dated Sept. 7, 1976. Disclaimer filed May 24, 1977, by the assignee, *Glentore Timber Products Limited*.

Hereby enters this disclaimer to claims 12–17 of said patent.

[*Official Gazette July 26, 1977.*]